Patented Nov. 16, 1943

2,334,229

UNITED STATES PATENT OFFICE 2,334,229

PREPARATION OF FLUOROPHENOLS

Chester M. Suter, Evanston, Ill., assignor to Sharp & Dohme, Incorporated, Philadelphia, Pa., a corporation of Maryland No Drawing. Application September 15, 1938, Serial No. 230,028

1 Claim. (Cl. 260—623)

This invention concerns hydrocarbon radical substituted fluoro-phenols, intermediates for their preparation, and the preparation of these compounds.

The hydrocarbon radical substituted fluoro-phenols of this invention have at least one fluorine atom substituted in the nucleus and, also linked to the nucleus, at least one hydrocarbon radical which may be saturated or unsaturated, straight or branched chain alkyl, cyclo-alkyl, aralkyl, or aryl, and are illustrated by the general formula

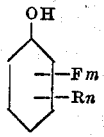

in which $m$ is an integer less than 4 and $n$ is either 1 or 2, and in which R is a hydrocarbon radical of the type above described. When $n$ is 2, it is understood that each hydrocarbon radical replaces a different nuclear hydrogen. Those hydrocarbon radical substituted fluoro-phenols having $m$ and $n$ of the general formula each equal to 1 are distinctly useful, and of these the 2-hydrocarbon radical substituted-4-fluoro-phenols exhibit desirable applicability, while the 2-alkyl-4-fluoro-phenols and particularly the 2-n-alkyl-4-fluoro-phenols are characteristically effective.

These hydrocarbon radical substituted fluoro-phenols have high phenol coefficients, low toxicity and other valuable therapeutic properties. They are useful as microbicides, antiseptics, preservatives, intermediates, etc., and for the treatment of bacterial infections, etc.

These compounds are for the most part, viscous high-boiling, water-white liquids, slightly soluble in water and quite soluble in alcohol, ether, acetone and many other organic solvents. They may conveniently be used in alcohol or alcohol-glycerin solutions.

Several methods may be employed for preparing hydrocarbon radical substituted fluoro-phenols. In one method, a fluoro-phenol, obtained, for example, by dealkylation of a fluoro-aryl alkyl ether with a suitable dealkylating agent, such as aluminum chloride in an inert solvent, for example benzene, is reacted with an acyl halide to yield the corresponding acyl ester of the fluoro-phenol. Such ester upon rearrangement, produced, for example, by treatment with aluminum chloride, zinc chloride, or other agent capable of causing the rearrangement, is converted to a hydroxyfluoro-phenyl hydrocarbon radical substituted ketone in which the hydrocarbon radical contains one less methylene group than the hydrocarbon radical substituent sought in the end product. The ketone is then reduced by a suitable reduction method, such as the zinc amalgam method, to the desired hydrocarbon radical substituted fluoro-phenol. For convenience this complete procedure may be referred to briefly as the Fries rearrangement, reduction method.

In relation to the just described method in this specification and in the appended claim, the term "acyl" is employed to designate broadly the radical $R_1CO$—, in which $R_1$ may be a saturated or unsaturated, straight or branched chain alkyl, cyclo-alkyl, aralkyl, or aryl hydrocarbon group.

An extended variety of acyl halides, whether chlorides or bromides, may be employed to yield the corresponding acyl esters of the fluoro-phenol by reaction with a fluoro-phenol, as typified by the acyl halides obtained from straight or branched chain alkyl, cyclo-alkyl, aralkyl, alkyl-aryl, and aryl carboxylic acids, whether saturated or unsaturated in the alkyl radical, such as acetic, propionic, crotonic, butyric, iso-butyric, valeric, iso-valeric, caproic, heptoic, caprylic, capric, lauric, naphthenic, cyclopentanecarboxylic, hexahydrobenzoic, phenylacetic, phenylpropionic, tolylacetic, cinnamic, toluic, dimethyl benzoic, and benzoic acids, and the like.

The Fries rearrangement, reduction method may be illustrated by, although not limited to, the following specific example:

EXAMPLE 1

Preparation of 2-ethyl-4-fluorophenol: To 1 mol of p-fluoro-phenol in a suitable reaction vessel, there is added a slight molal excess of acetyl chloride and the reaction mixture heated at 100° C. until all the hydrogen chloride formed is expelled. The reaction product is then fractionated, yielding about 93% of p-fluorophenyl acetate boiling at 85–87° C. at 16 mm. Hg. To the ester thus formed, the aluminum chloride is added in small portions with vigorous stirring, and the mixture heated to about 150° C. for 30 minutes. Ice and dilute hydrochloric acid are added to decompose the aluminum chloride complex and the mixture is extracted with ether and the ether extract treated with a 10% aqueous alkaline solution. The ketone thus isolated is precipitated by the addition of acid and is purified by vacuum distillation. The fraction boiling at 94–99° C. at 12 mm. Hg is 2-acetyl-4-fluorophenol, which solidifies on cooling and upon crystallization from 80%–90% methanol melts at 56–56.5° C.

Reduction of 23.6 g. (0.167 mol) of 2-acetyl-4-fluoro-phenol with 40 g. of amalgamated mossy zinc and a solution made up of 70 cc. of methanol and 200 cc. of dilute (1:2) hydrochloric acid for 15 hours with occasional addition of more concentrated hydrochloric acid gives 2-ethyl-4-fluoro-phenol, boiling at 64–65° C. at 3 mm. Hg.

Physical constants for some of the acyl esters of p-fluoro-phenol similarly prepared are given in Table I, and of some of the hydroxy fluoro-phenyl alkyl ketones in Table II, and of corresponding alkyl-fluoro-phenols in Table III.

TABLE I

*p-Fluorophenyl esters*

| Ester | B. P., °C. (mm.) | Density $d^{25}_4$ | Refractive index $n^{25}_D$ |
|---|---|---|---|
| Acetate | 85 –87 (16) | 1.170 | 1.4830 |
| Propionate | 102–103 (19) | 1.128 | 1.4768 |
| n-Butyrate | 124–125 (36) | 1.103 | 1.4729 |
| n-Valerate | 120–124 (16) | 1.094 | 1.4832 |
| n-Caproate | 134–140 (16) | 1.046 | 1.4719 |

TABLE II

*2-acyl-4-fluorophenols*

| Acyl | B. P., °C. (mm.) | M. P., °C. |
|---|---|---|
| Acetyl | 94– 99 (12) | 56–56.5 |
| Propionyl | 117–121 (22) | 30.5 |
| n-Butyryl | 116–118 (14) | 38–39 |
| n-Valeryl | 131–135 (14) | 7–9 |
| n-Caproyl | 146–147 (12) | 49–50 |

TABLE III

*2-alkyl-4-fluorophenols*

| Alkyl | B. P., °C. (mm.) | Density $d^{25}_4$ | Refractive index $n^{25}_D$ |
|---|---|---|---|
| Ethyl | 64– 65 (3) | 1.124 | 1.5056 |
| n-Propyl | 67.5– 68 (2.5) | 1.088 | 1.5000 |
| n-Butyl | 90.5– 91 (4) | 1.061 | 1.4964 |
| n-Amyl | 104.5–105.5 (4) | 1.041 | 1.4958 |
| n-Hexyl | 106–107 (2.5) | 1.032 | 1.4956 |

| | Phenoxyacetic acids, M. P., °C. |
|---|---|
| Ethyl | 96 – 97 |
| n-Propyl | 73.5–[1]74 |
| n-Butyl | 73 –[1]73.5 |
| n-Amyl | 63 – 64 |

[1] A mixture of the propyl and butyl compounds melted at 63–65°.

For purposes of identification, the hydrocarbon radical substituted fluorophenols of this invention may be converted into the corresponding phenoxyacetic acids by reacting them with sodium chloroacetate in alkaline solution.

According to the present invention, a more satisfactory method for preparing these hydrocarbon radical substituted fluorophenols consists in treating a fluoro-aryl alkyl ether with bromine to obtain the bromo-fluoro-aryl alkyl ether, which is made into a Grignard reagent and reacted with a suitable aldehyde, to form the alkoxy-fluorophenyl hydrocarbon radical substituted carbinol. The carbinol, thus obtained, is dehydrated by treatment with a suitable dehydrating agent, such as phosphoric acid, potassium bisulfate, etc., to give the unsaturated hydrocarbon radical substituted fluoro-aryl alkyl ether, which is reduced catalytically with hydrogen in the presence of a suitable catalyst, such as platinum oxide, and the like, to form the saturated hydrocarbon radical substituted fluoro-aryl alkyl ether. This hydrocarbon radical substituted fluoro-aryl alkyl ether is converted to the desired hydrocarbon radical substituted fluoro-phenol by dealkylation with a suitable dealkylating agent, for example, by heating with hydriodic and acetic acids. Hydrobromic acid may replace the hydriodic acid in the dealkylation. This method may be illustrated by the accompanying equations:

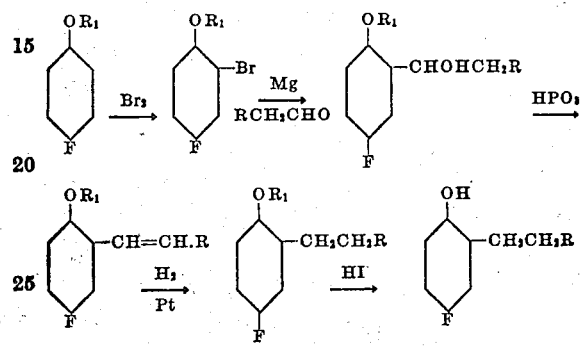

where R may be a hydrogen atom, or a saturated or unsaturated, straight or branched chain, alkyl, cyclo-alkyl, aralkyl, or aryl hydrocarbon radical, and in which $R_1$ is an alkyl group, preferably a lower alkyl group, such as methyl, ethyl, etc.

As employed in this specification and the appended claim the term "hydrocarbon radical" means the monovalent radical obtained by removing one atom of hydrogen from any of the various types of hydrocarbon compounds referred to herein. Wherever the term "saturated or unsaturated" is employed herein in defining the scope of the "hydrocarbon radical," it refers to the alkyl radical and the alkyl portion of the hydrocarbon radical.

This second method may be more briefly referred to herein as the bromination-aldehyde process.

The bromination-aldehyde process may be specifically illustrated by, but not restricted to, the following example:

EXAMPLE 2

Preparation of 2-butyl-4-fluoro-phenol: Into a 3 liter, three-necked flask, equipped with a mercury-sealed stirrer, an efficient reflux condenser and a dropping funnel, are placed 350 g. (2.5 mols) of p-fluorophenetole, 750 cc. of carbon tetrachloride and a few iron tacks. While maintaining the mixture at the boiling point, there is added 138 cc. (2.6 mols) of bromine over a period of 1.5 hours. After refluxing for another hour, the mixture is cooled, washed with water and then once with Claisen's solution to remove any phenolic products, and the reaction product dried and distilled. The 2-bromo-4-fluorophenetole obtained boils at 108°–111° C. at 24 mm. pressure, $d^{25}_4$ 1.0472, $N^{25}_D$ 1.5255. The yield is 90%. To a Grignard reagent prepared from 292 g. (1.33 mols) of 2-bromo-4-fluorophenetole and 32 g. (1.33 mols) of magnesium turnings in 400 cc. of ether, there is added during 1.5 hours 117 cc. (1.33 mols) of n-butyraldehyde dissolved in 300 cc. of ether. The reaction flask is cooled in ice and salt during the addition. The reaction mixture is then refluxed for 1.5 hours, hydrolyzed with 600 cc. of 10% hydrochloric acid and the ether layer is dried and distilled. The n-propyl-2-ethoxy-5-fluorophenyl carbinol is obtained in the fraction boiling at 158° C. at 19 mm. pressure.

The carbinol, thus prepared, is dehydrated to 2-n-butenyl-4-fluorophenetole with phosphoric acid as follows: A 50 cc. Claisen flask, a condenser and receiver are set up as for the usual vacuum distillation. About 10 cc. of 85% phosphoric acid is placed in the flask and a dropping funnel with a stem reaching to the bottom of the flask is employed for the introduction of the carbinol. The system is evacuated to about 10 mm., the flask heated in an oil bath to maintain the mixture at 200° C. while adding 75 g. of n-propyl-2-ethoxy-5-fluorophenyl carbinol dropwise. After all the carbinol has been added, the temperature is raised to 260° C. to distill over the last traces of the resulting olefin. Ether is added to the clear, almost colorless distillate. The water layer is separated and the ether solution dried and fractionated to give 2-n-butenyl-4-fluorophenetole, boiling at 120°–124° C. at 13 mm. pressure.

To a solution of 25 g. of 2-n-butenyl-4-fluorophenetole in 100 cc. of absolute alcohol is added 0.17 g. of platinum oxide hydrogenation catalyst and the mixture shaken with hydrogen under 30 pounds initial pressure. The reaction is complete in about 10 minutes. After filtering off the platinum black, the alcohol is removed through a column and the residual oil fractionated. The fraction boiling at 112°–113° C. at 14 mm. pressure is 2-n-butyl-4-fluorophenetole.

24.8 g. of this 2-n-butyl-4-fluorophenetole is refluxed with 150 cc. of 58% hydriodic acid and 175 cc. of glacial acetic acid until an insoluble oil no longer forms therefrom when a drop of reaction solution is added to a dilute aqueous alkali solution. Dealkylation is then complete. The reaction mixture is then diluted with water, neutralized with sodium carbonate, made acid to Congo red with hydrochloric acid and extracted several times with benzene. The benzene fraction is then extracted with Claisen's solution, the Claisen's solution layer acidified and extracted with ether. Distillation of the ether soluble product gives pure 2-n-butyl-4-fluorophenol, boiling at 90.5°–91° C. at 4 mm. pressure.

Of the fluoro-aryl alkyl ethers used in the above described methods, the fluorophenyl alkyl ethers, as well as the fluorophenyl lower alkyl ethers, yield subsequent intermediates and end products, of the types of the invention, having distinctive characteristics.

Among the new intermediates of this invention are the fluorophenyl esters, the acyl-fluorophenols, the hydrocarbon radical substituted-lower-alkoxy-fluorophenyl carbinols, the unsaturated hydrocarbon radical substituted-fluoro-aryl alkyl ethers, and the saturated hydrocarbon radical substituted fluoro-aryl alkyl ethers.

The general methods for obtaining the fluorophenyl esters and the acyl-fluorophenols are found hereinabove in the corresponding intermediate portions of the description of the Fries rearrangement, reduction method of making the hydrocarbon radical substituted fluorophenols. The corresponding intermediate portions of the procedure in Example 1 represent specific illustrations for producing a respective specific example of each of these two intermediate products. Physical constants for some of the fluorophenyl esters and for some of the acyl-fluorophenols appear in Tables I and II above.

In the respective intermediate portions of the general description of the bromination-aldehyde process for obtaining the hydrocarbon radical substituted fluorophenols, there is given a general method for the preparation of each of the alkoxy-fluorophenyl carbinols, the unsaturated hydrocarbon radical substituted fluoro-aryl alkyl ethers, and the hydrocarbon radical substituted fluoro-aryl alkyl ethers respectively. The corresponding intermediate portions of Example 2 above illustrate the preparation of a specific example of each of these three types of intermediate product. Physical constants for some of each of these last three types of intermediates appear in the following tables:

TABLE IV

*Alkyl-2-ethoxy-5-fluorophenyl carbinols*

| Alkyl | B. P., °C. (mm.) | Density $d^{25}_4$ | Refractive index $n^{25}_D$ |
|---|---|---|---|
| Methyl | 111 (6) | 1.127 | 1.4985 |
| n-Propyl | 158 (19) | 1.067 | 1.4920 |
| n-Butyl | 165 (15) | 1.054 | 1.4909 |
| n-Amyl | 170–172 (7) | 1.034 | 1.4895 |

TABLE V

*2-alkenyl-4-fluorophenetoles*

| Alkenyl | B. P., °C. (mm.) | Density $d^{25}_4$ | Refractive index $n^{25}_D$ |
|---|---|---|---|
| n-Propenyl | 91–94 (6) | 1.037 | 1.5246 |
| n-Butenyl | 120–124 (13) | 1.023 | 1.5145 |
| n-Pentenyl | 108–112 (4) | 1.008 | 1.5128 |
| n-Hexenyl | 134–138 (9) | 0.996 | 1.5030 |

TABLE VI

*2-alkyl-4-fluorophenetoles*

| Alkyl | B. P., °C. (mm.) | Density $d^{25}_4$ | Refractive index $n^{25}_D$ |
|---|---|---|---|
| Ethyl | 68–68.5 (2.5) | 1.029 | 1.4801 |
| n-Propyl | 101–102 (16) | 1.000 | 1.4782 |
| n-Butyl | 112–113 (14) | 0.988 | 1.4780 |
| n-Amyl | 122–126 (11) | 0.982 | 1.4797 |
| n-Hexyl | 107–108 (3) | 0.982 | 1.4820 |

In the bromination-aldehyde process for obtaining the hydrocarbon radical substituted fluorophenols and in the methods for obtaining the intermediate products of the types described in Tables 4, 5, and 6 respectively, the aldehyde employed may be represented by the general formula $RCH_2CHO$, in which R may be hydrogen or a saturated or unsaturated, straight or branched chain alkyl, cyclo-alkyl, aralkyl, or aryl hydrocarbon radical. Thus a wide variety of aldehydes may be employed, as typified by the following: acetaldehyde, propionaldehyde, butyraldehyde, isobutyraldehyde, valeraldehyde, isovaleraldehyde, caproaldehyde, heptaldehyde, capraldehyde, caprylic aldehyde, lauraldehyde, and hydrocinnamaldehyde.

By employing ortho- or meta-fluorophenols or difluoro- or trifluorophenols in place of the parafluorophenol, and by employing ortho- or meta-fluoro-aryl alkyl ethers or difluoro- or trifluoro-aryl alkyl ethers in place of the parafluoro-aryl alkyl ethers in the respective examples hereinabove set forth, the substitution of the hydrocarbon radical may be made in other positions and the corresponding hydrocarbon radical substituted mono- or poly-fluorophenol obtained.

Some of the compounds of the invention may be prepared by other methods. For example, the branched chain hydrocarbon radical substituted fluorophenols may be produced by a direct condensation of an alcohol, or an alkyl or aralkyl halide with any suitable fluorophenol in the presence of a condensing agent capable of causing the condensation, such as sulfuric acid, zinc chloride, ferric chloride, and the like.

The di-hydrocarbon radical substituted fluorophenols may be prepared by using a mono-hydrocarbon radical substituted fluorophenol as the starting material in any of the methods herein described.

The term "alkyl" employed in the appending sub-generic claim includes the straight, branched chain and cyclic-alkyl radicals.

In the Fries rearrangement-reduction method above described the dealkylation may be brought about in the presence of any suitable dealkylating agent capable of effecting the dealkylation, other than aluminum chloride named in the example, such as hydrobromic or hydriodic acid, and the like, either alone or in a suitable solvent, as acetic acid.

Instead of using hydriodic acid in acetic acid as the dealkylating agent in the bromination-aldehyde process, any suitable dealkylating agent capable of effecting the dealkylation, for example, aluminum chloride in a suitable inert solvent such as benzene or toluene, may be employed.

The iron tacks employed during the refluxing and bromination at the beginning of the process of Example 2, may be replaced by any other catalyst capable of making the bromination proceed at a more rapid rate, for example, iodine, or an iron or aluminum salt.

The Claisen's solution used in the purification of the alkylfluorophenols, as in Example 2, is the commonly known solution, namely, an aqueous methyl or ethyl alcoholic solution of an alkali hydroxide.

In place of the platinum oxide hydrogenation catalyst employed in Example 2 for converting the alkenyl fluorophenetole to the alkyl fluorophenetole, any other hydrogenation catalyst suitable for the reduction, such as nickel or palladium, may be employed. In some instances, the operating conditions (temperature, pressure and solvent) may be modified.

By the term "hydroxy fluoro-phenyl hydrocarbon radical substituted ketone," employed in this specification and in the appended claim, is meant a ketone of the general formula

in which M is a hydroxyfluoro-phenyl radical and R is a hydrocarbon radical.

It is understood that numerous modifications, changes, and substitutions may be made in any of the specific examples herein described without departing from the invention, which is limited in scope to the construction of the appended claim.

I claim:

The method of producing saturated hydrocarbon radical fluorophenols having the general formula

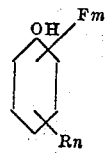

in which $m$ is an integer less than 4 and $n$ is an integer less than 3 and in which R is a hydrocarbon radical selected from the class consisting of aryl radicals and normal saturated alkyl radicals consisting of straight and branched chain alkyl and aralkyl radicals, which method comprises mono-brominating a fluoro-aryl alkyl ether, converting the fluoro-aryl alkyl ether thus obtained into a Grignard reagent and reacting said reagent with a suitable aldehyde, dehydrating the resulting hydrocarbon radical substituted alkoxy fluorophenyl carbinol, and catalytically reducing any —C=C— linkage in the unsaturated hydrocarbon radical substituted fluoro-aryl alkyl ether secured as a result of the dehydration, to form the saturated hydrocarbon radical substituted fluoro-aryl alkyl ether, and dealkylating said saturated hydrocarbon radical substituted fluoro-aryl alkyl ether to obtain the corresponding hydrocarbon radical substituted fluorophenol.

CHESTER M. SUTER.